United States Patent
Kim

(10) Patent No.: US 9,168,692 B2
(45) Date of Patent: Oct. 27, 2015

(54) COVER SHEET SUPPLY APPARATUS HAVING VARIABLE CLAMP FOR THERMOFORMING MACHINE

(71) Applicant: GUNGYANG ITT CO., LTD., Busan (KR)

(72) Inventor: Taek-hyun Kim, Busan (KR)

(73) Assignee: GUNGYANG ITT CO., LTD., Busan (KR)

( * ) Notice: Subject to any disclaimer, the term of this patent is extended or adjusted under 35 U.S.C. 154(b) by 0 days.

(21) Appl. No.: 14/320,786

(22) Filed: Jul. 1, 2014

(65) Prior Publication Data
US 2015/0072040 A1 Mar. 12, 2015

Related U.S. Application Data

(63) Continuation of application No. PCT/KR2013/004204, filed on May 13, 2013.

(51) Int. Cl.
| | |
|---|---|
| *B29C 51/26* | (2006.01) |
| *B29C 31/10* | (2006.01) |
| *B29C 31/08* | (2006.01) |
| *B29C 51/42* | (2006.01) |
| *B29K 105/00* | (2006.01) |
| *B29L 31/30* | (2006.01) |

(52) U.S. Cl.
CPC ............... *B29C 51/262* (2013.01); *B29C 31/08* (2013.01); *B29C 31/10* (2013.01); *B29C 51/26* (2013.01); *B29C 51/421* (2013.01); *B29C 31/085* (2013.01); *B29K 2105/256* (2013.01); *B29L 2031/3005* (2013.01)

(58) Field of Classification Search
CPC .... B29C 31/08; B29C 51/262; B29C 51/421; B29L 2031/3005; B29K 2105/256
USPC ................. 425/193, 384, 397, 400, DIG. 48
See application file for complete search history.

(56) References Cited

U.S. PATENT DOCUMENTS

| | | | | |
|---|---|---|---|---|
| 4,099,901 | A * | 7/1978 | Shuman | 425/388 |
| 5,843,492 | A * | 12/1998 | McCorry | 425/397 |
| 6,361,304 | B1 * | 3/2002 | Petersen | 425/397 |

* cited by examiner

*Primary Examiner* — Joseph S Del Sole
*Assistant Examiner* — Thukhanh T Nguyen
(74) *Attorney, Agent, or Firm* — Park & Associates IP Law, P.C.

(57) ABSTRACT

Disclosed herein is a cover sheet supply apparatus having variable clamps for a thermoforming machine. The apparatus includes a support frame (100); longitudinal guides (200) which are disposed in the support frame and each of which includes a longitudinal rail (210) and a longitudinal fixed unit (220); lateral guides (300) which are disposed in the support frame on opposite sides of the longitudinal guides, and each of which includes a lateral rail (310) and a lateral fixed unit (320); longitudinal movable clamps (230) which are installed on each longitudinal rail and are connected to each other by a longitudinal link (400); lateral movable clamps (330) which are installed on each lateral rail and are connected to each other by a lateral link (500); a lateral moving means (600) which moves the longitudinal guides in the lateral direction; and a longitudinal moving means (700) which moves the lateral guides in the longitudinal direction.

7 Claims, 8 Drawing Sheets

COVER SHEET SUPPLY APPARATUS HAVING VARIABLE CLAMP FOR THERMOFORMING MACHINE

REFERENCE TO RELATED APPLICATIONS

This is a continuation of pending International Patent Application PCT/KR2013/004204 filed on May 13, 2013, the entire contents of which are incorporated herein by reference.

FIELD OF THE INVENTION

The present invention relates, in general, to cover sheet supply apparatuses having variable clamps for thermoforming machines and, more particularly, to a cover sheet supply apparatus having variable clamps for thermoforming machines which is configured such that a plurality of clamps connected to each other by links clamp the perimeter of a cover sheet and then are horizontally moved by means of a screw to uniformly stretch, in four side directions, the entire area of the cover sheet that has been heated and thus has softened and sagged.

BACKGROUND OF THE INVENTION

Generally, thermoforming machines are used to manufacture interior materials of vehicles, for example, door trims, instrument panels, dashboards, headliners, carpets, luggage boards, etc. of vehicles.

Particularly, the thermoforming machines are mainly used to adhere a cover sheet to the surface of a substrate of a door trim of a vehicle. Door trims for vehicles typically have a variety of shapes depending on the models of vehicles such that parts of speakers, power windows, etc. of the corresponding vehicle models can be installed in the door trims. Given this, various techniques related to methods of adhering a cover sheet to a substrate of a door trim have been developed.

Generally, a method of manufacturing a door trim for vehicles includes: placing a hard substrate, formed in a predetermined shape by a forming apparatus, on a lower mold; placing a cover sheet, heated by a heater, on the hard substrate; and moving an upper mold downwards to compress the cover sheet onto the substrate.

Matching the size of the cover sheet with that of the door trim is followed by heating the cover sheet using the heater and compressing it onto the substrate of the door trim.

However, when the cover sheet is heated by the heater, it is expanded, so that the cover sheet may become larger than the door trim.

As a result, there is a problem in that cover sheets that become larger than the size of the door trim are discarded during a production process.

Such cover sheets are selectively used only in luxury cars because they are relatively expensive. As the number of cover sheets discarded is increased, the unit cost of production is also increased.

Furthermore, if the cover sheet is expanded, it sags downwards. In this case, the cover sheet wrinkles during the forming process, thus becoming a defective product.

In an effort to overcome the above problems, apparatuses which include variable clamps arranged along the perimeter of a cover sheet to clamp the cover sheet expanded by heat and stretch it has been proposed.

These conventional apparatuses with the variable clamps can clamp the perimeter of the cover sheet that has been expanded and softened and stretch the cover sheet in opposite directions, but cannot stretch the cover sheet in a direction perpendicular to the opposite directions. In other words, these apparatuses cannot adjust the distance between the clamps that face each other. Therefore, these conventional apparatuses cannot uniformly stretch the entire area of the cover sheet. As a result, the effect of reducing the consumption of material needed for cover sheets is comparatively low, and it is difficult to enhance the quality of the products to a satisfactory level.

To solve these problems related to the conventional techniques introduced in Korean Patent Application Nos. 20-2004-0036254 and 20-2002-0021114, entitled "Apparatus for adhering interior material or cover sheet for door trims", an apparatus for supplying a cover sheet for vacuum forming machines was proposed in Korean Patent Registration No. 10-0837314, which was filed by the inventor of the present invention. Detailed description of this apparatus of No. 10-0837314 will be omitted.

SUMMARY OF THE INVENTION

Accordingly, the present invention has been made keeping in mind the above problems occurring in the prior art, and an object of the present invention is to provide a cover sheet supply apparatus having variable clamps for thermoforming machines which stretch a cover sheet, which has been heated by a heater and thus has softened and sagged, and prevent the cover sheet from sagging, thus preventing the cover sheet from being wrinkled during a forming process, whereby consumption of material needed for the cover sheet is reduced by the length by which it is stretched, and the entire area of the cover sheet can be uniformly stretched, thereby enhancing the quality of a formed product.

In order to accomplish the above object, the present invention provides a cover sheet supply apparatus having variable clamps for a thermoforming machine, the thermoforming machine including a heating unit for heating the cover sheet provided to be adhered to an interior material of a vehicle, the cover sheet supply apparatus including: a support frame provided in the cover sheet supply apparatus; a pair of longitudinal guides disposed in the support frame at positions spaced apart from each other by a predetermined distance, each of the longitudinal guides comprising a longitudinal rail, with a longitudinal fixed unit fixed to the longitudinal rail; a pair of lateral guides disposed in the support frame on opposite sides of the longitudinal guides at positions spaced apart from each other by a predetermined distance, each of the lateral guides comprising a lateral rail, with a lateral fixed unit fixed to the lateral rail; a plurality of longitudinal movable clamps installed on each of the longitudinal rails at regular intervals to clamp the cover sheet, the longitudinal movable clamps being successively connected to each other by a longitudinal link from the longitudinal fixed unit to the lateral guides; a plurality of lateral movable clamps installed on each of the lateral rails at regular intervals to clamp the cover sheet, the lateral movable clamps being successively connected to each other by a lateral link from the lateral fixed unit to the longitudinal guides; a lateral moving means provided on the fixed frame, the lateral moving means configured to move the longitudinal guides forwards and backwards in the lateral direction; and a longitudinal moving means provided on the fixed frame, the longitudinal moving means configured to move the lateral guides forwards and backwards in the longitudinal direction, wherein when the cover sheet is heated by the heating unit and thus expanded and softened, the lateral moving means and the longitudinal moving means move the longitudinal guides and the lateral guides so that the cover sheet is stretched.

The lateral moving means may include: a lateral screw passing through predetermined portions of the longitudinal guides to move the longitudinal guides in the lateral direction, the lateral screw being provided at opposite ends thereof in the support frame; and a lateral motor configured to rotate the lateral screw.

The longitudinal moving means may include: a longitudinal screw passing through predetermined portions of the lateral guides to move the lateral guides in the longitudinal direction, the longitudinal screw being provided at opposite ends thereof in the support frame; and a longitudinal motor configured to rotate the longitudinal screw.

Each of the lateral fixed units and the longitudinal fixed units may comprise a fixed clamp configured to clamp the cover sheet.

The fixed clamp may be disposed on a medial portion of each of the longitudinal guides and the lateral guides.

The longitudinal movable clamps may be disposed at a different height from the lateral movable clamps.

According to the present invention, even if a cover sheet is heated by a heater and expanded, the cover sheet can be used after it is stretched to an appropriate length, rather than being discarded as in the conventional process.

Therefore, the production cost in manufacturing an interior material product can be reduced, thus ensuring the price competitiveness.

Furthermore, clamps connected to each other by links can uniformly stretch the entire area of the cover sheet that has been expanded by heat, whereby the quality of a product can be enhanced.

DETAILED DESCRIPTION OF THE INVENTION

Hereinafter, a cover sheet supply apparatus having variable clamps for thermoforming machines according to the present invention will be described in detail with reference to the attached drawings.

Figure 1:
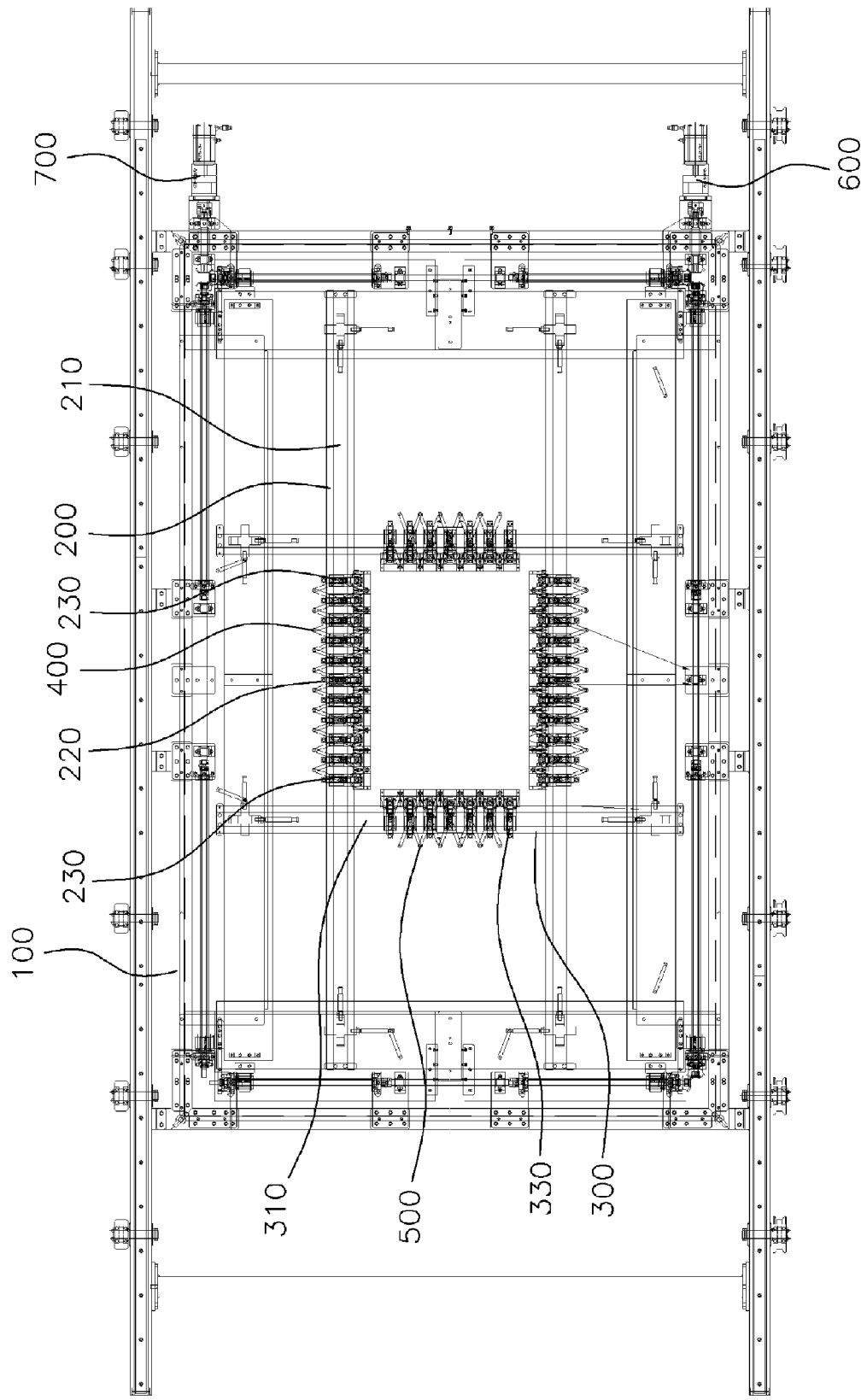
FIG. 1 is a plan view illustrating a cover sheet supply apparatus having variable clamps for thermoforming machines according to the present invention.
Figure 2:
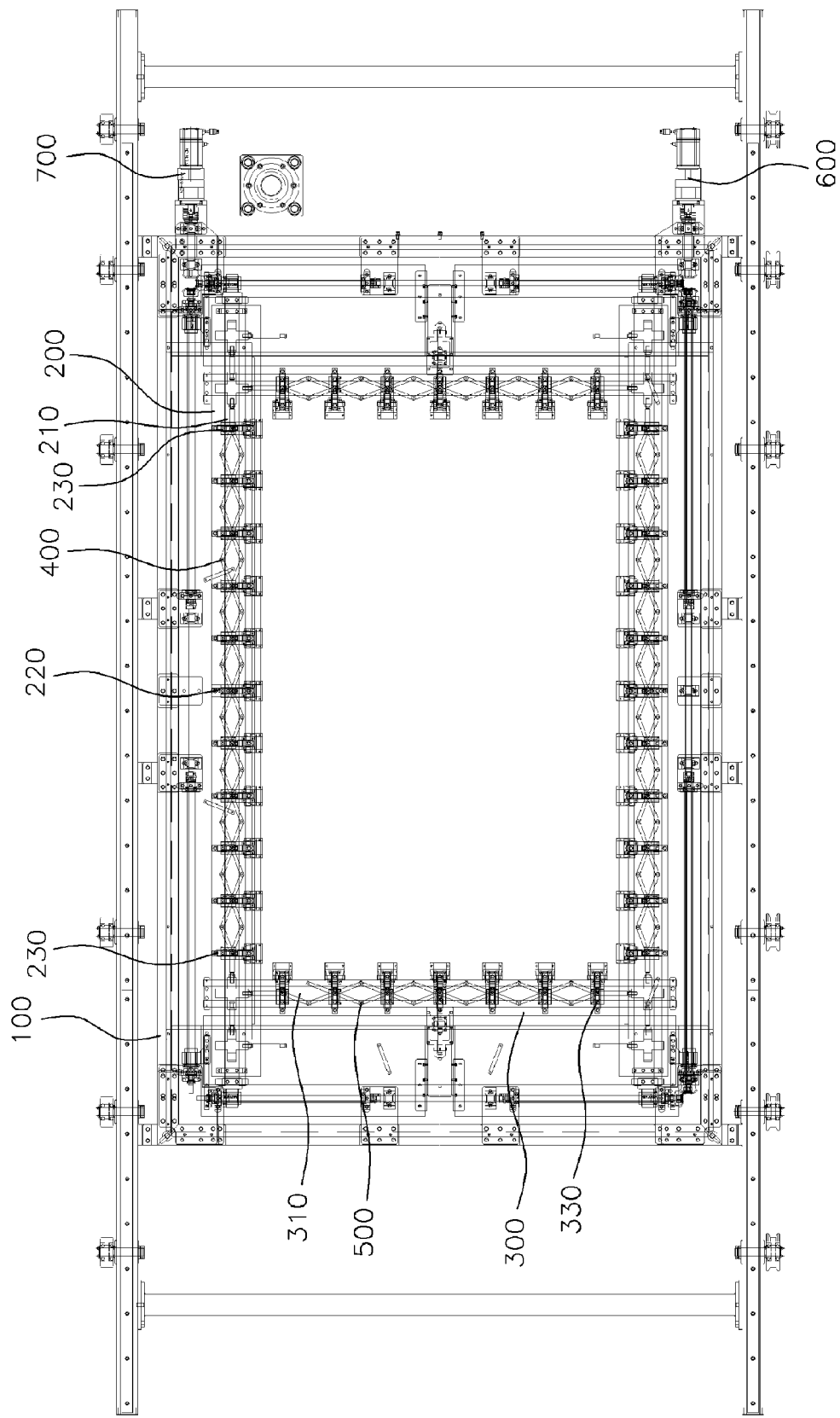
FIG. 2 is another plan view illustrating the cover sheet supply apparatus according to the present invention.
Figure 3:
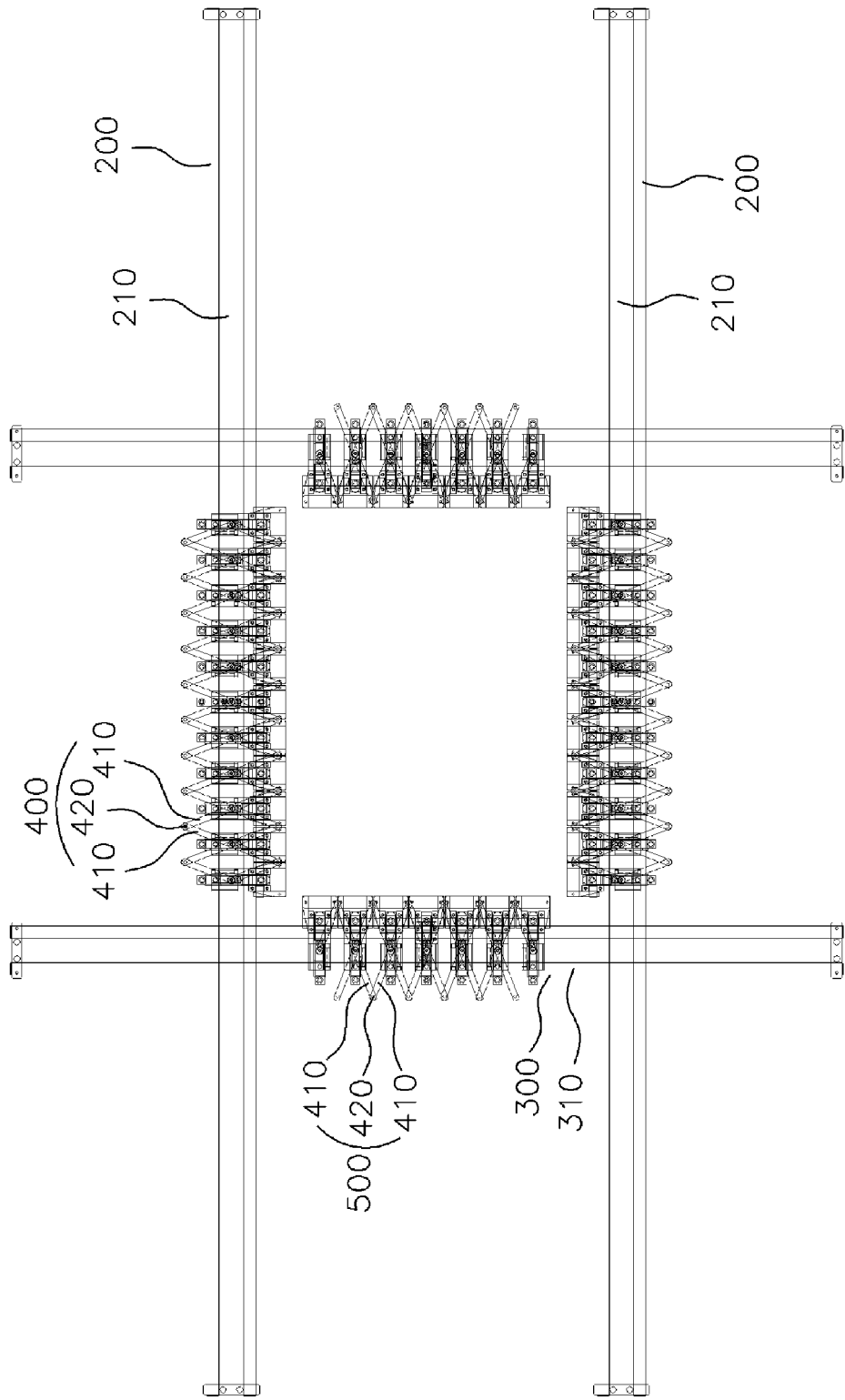
FIG. 3 is a view illustrating the cover sheet supply apparatus according to the present invention when it is in a contracted state.
Figure 4:
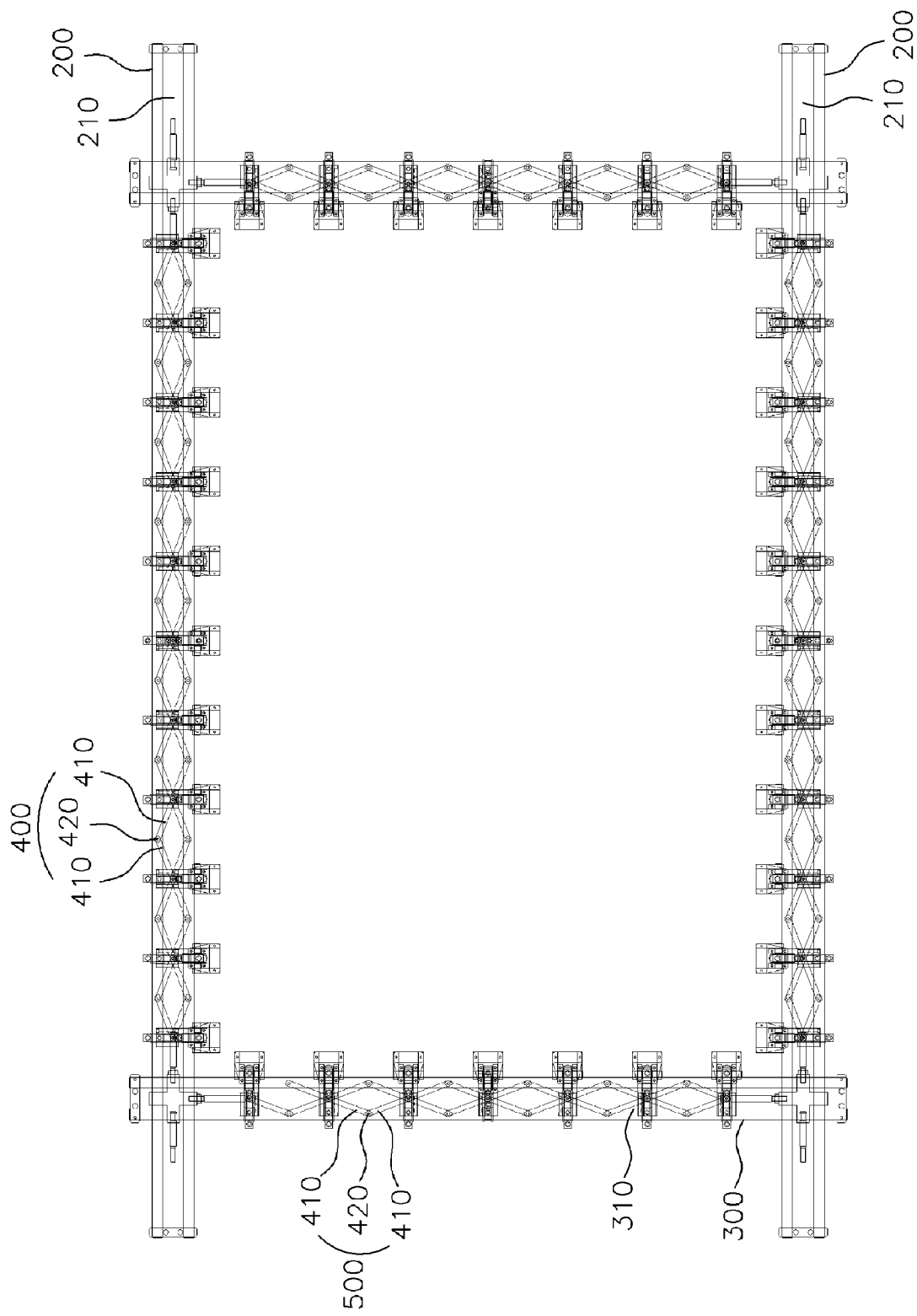
FIG. 4 is a view illustrating the cover sheet supply apparatus according to the present invention when it is in an expanded state.
Figure 5:
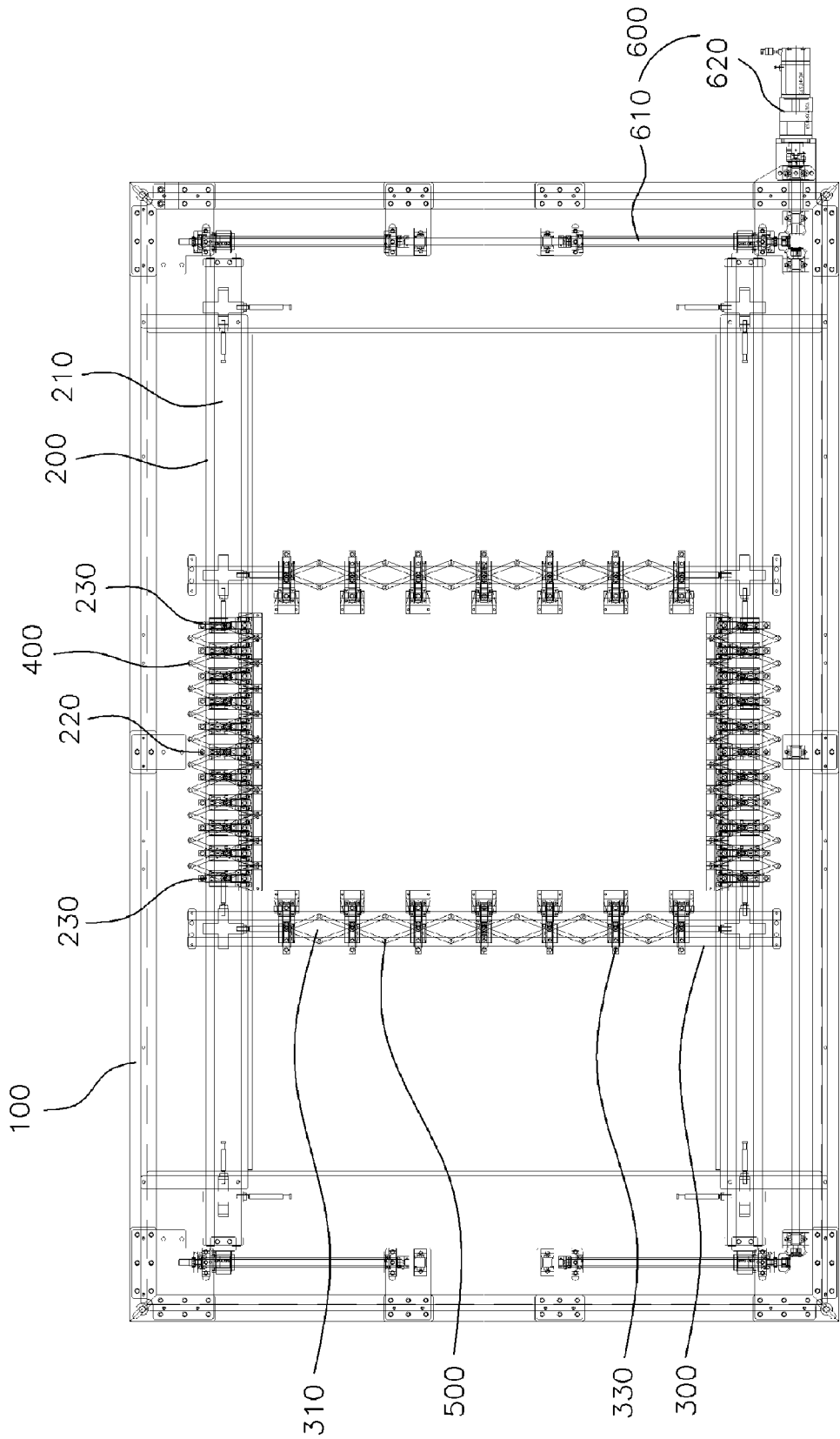
FIG. 5 is a view showing the operation of a lateral moving means of the cover sheet supply apparatus according to the present invention.
Figure 6:
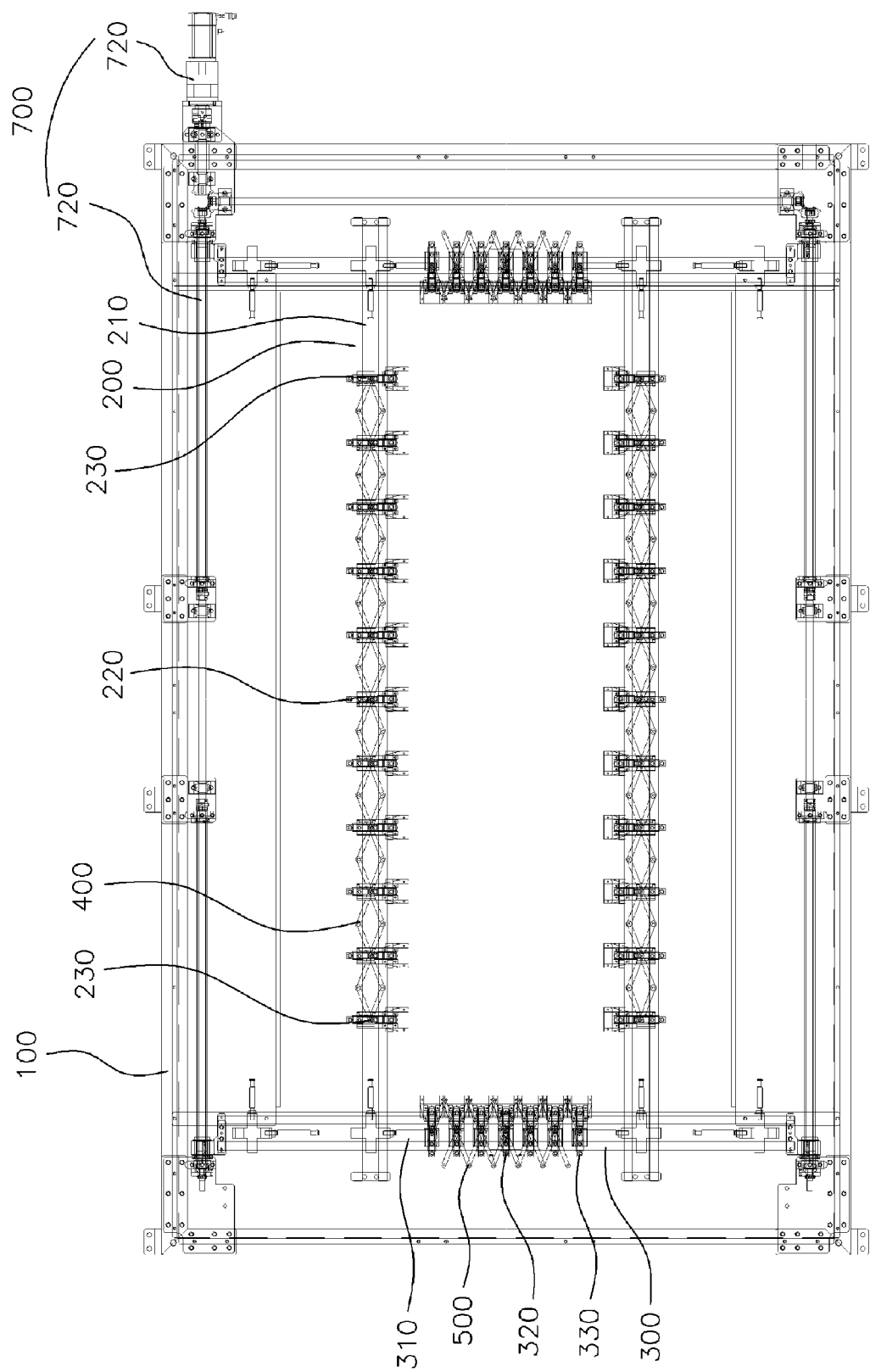
FIG. 6 is a view showing the operation of a longitudinal moving means of the cover sheet supply apparatus according to the present invention.
Figure 7:
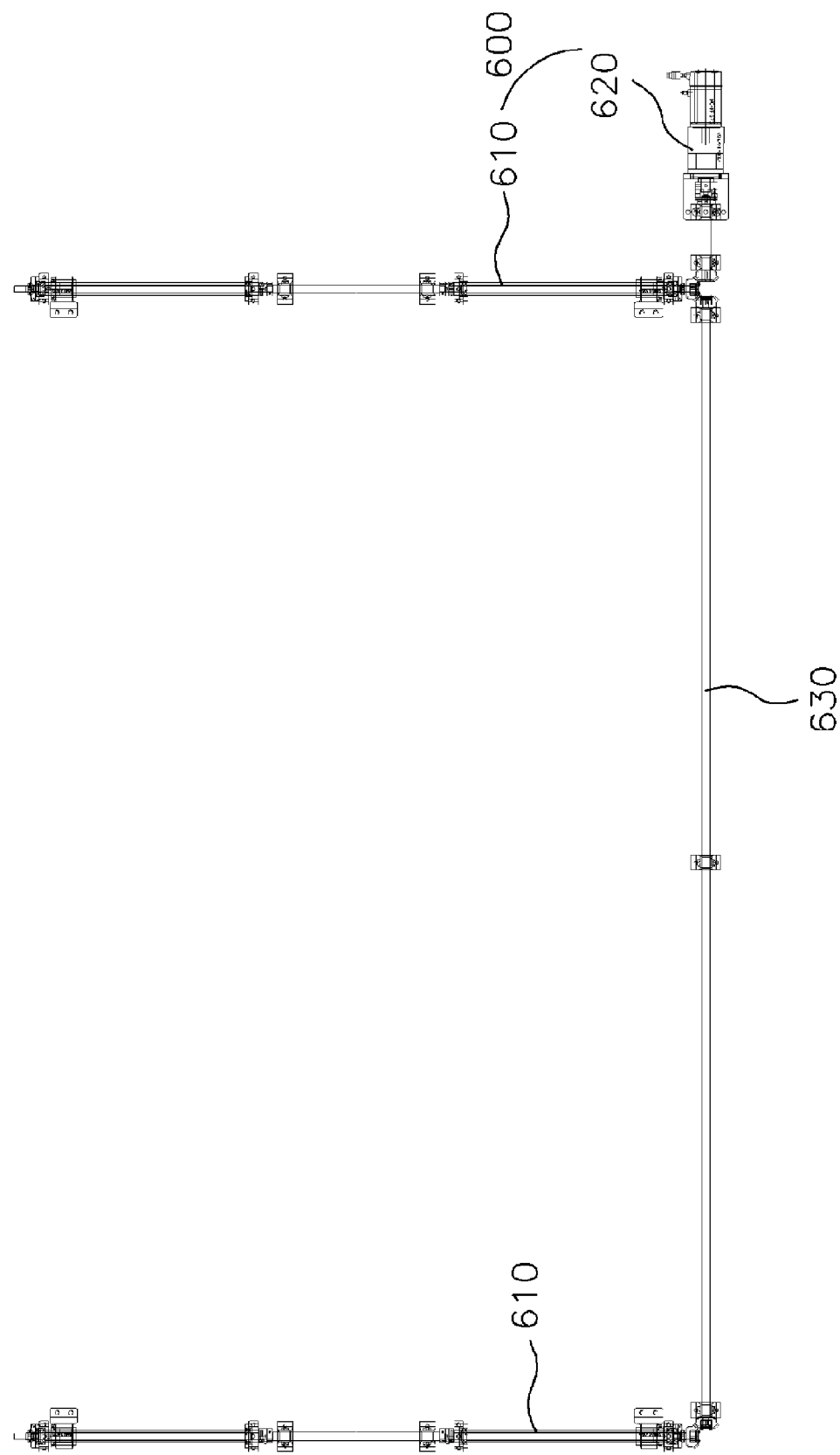
FIG. 7 is a plan view illustrating the lateral moving means of the cover sheet supply apparatus according to the present invention.
Figure 8:
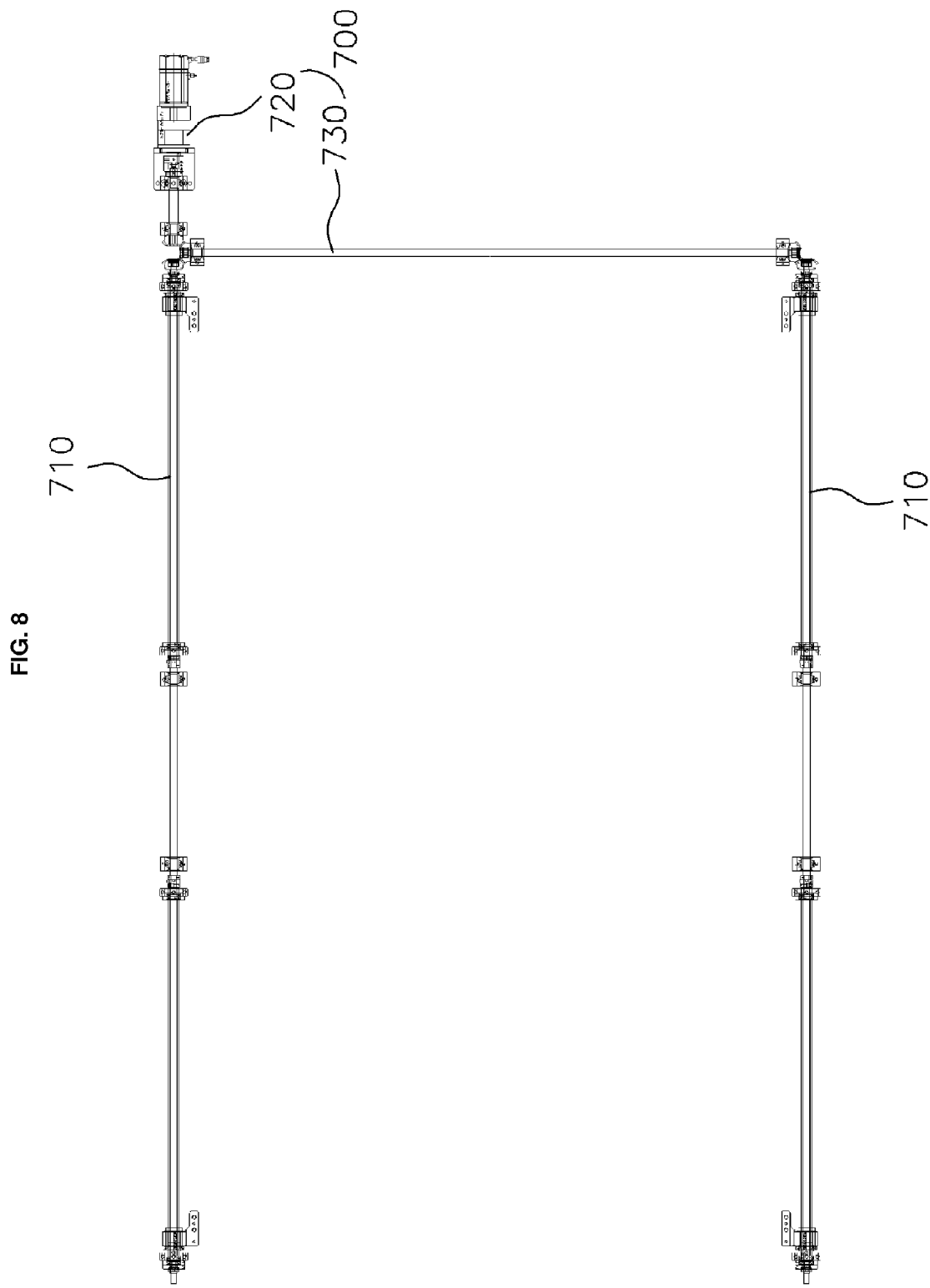
FIG. 8 is a plan view illustrating the longitudinal moving means of the cover sheet supply apparatus according to the present invention.

FIG. 1 is a plan view illustrating a cover sheet supply apparatus having variable clamps for thermoforming machines according to the present invention. FIG. 2 is another plan view illustrating the cover sheet supply apparatus according to the present invention. FIG. 3 is a view illustrating the cover sheet supply apparatus according to the present invention when it is in a contracted state. FIG. 4 is a view illustrating the cover sheet supply apparatus according to the present invention when it is in an expanded state. FIG. 5 is a view showing the operation of a lateral moving means of the cover sheet supply apparatus according to the present invention. FIG. 6 is a view showing the operation of a longitudinal moving means of the cover sheet supply apparatus according to the present invention. FIG. 7 is a plan view illustrating the lateral moving means of the cover sheet supply apparatus according to the present invention. FIG. 8 is a plan view illustrating the longitudinal moving means of the cover sheet supply apparatus according to the present invention.

As shown in FIGS. 1 through 8, the present invention provides the cover sheet supply apparatus for a thermoforming machine including a heating unit which heats the cover sheet to be adhered to an interior material of a vehicle. The apparatus includes: a support frame 100 which is provided in the apparatus for supplying a cover sheet for the thermoforming machine; a pair of longitudinal guides 200 which are disposed inside the support frame 100 at positions spaced apart from each other by a predetermined distance and each of which includes a longitudinal rail 210 with a longitudinal fixed unit 220 fixed to the longitudinal rail 210; a pair of lateral guides 300 which are disposed inside the support frame 100 on opposite sides of the longitudinal guides 200 at positions spaced apart from each other by a predetermined distance, and each of which includes a lateral rail 310 with a lateral fixed unit 320 fixed to the lateral rail 310; a plurality of longitudinal movable clamps 230 which are installed on each longitudinal rail 210 at regular intervals to clamp the cover sheet and are successively connected to each other from the longitudinal fixed unit 220 to the lateral guides 300 by longitudinal links 400; a plurality of lateral movable clamps 330 which are installed on each lateral rail 310 at regular intervals to clamp the cover sheet and are successively connected to each other from the lateral fixed unit 320 to the longitudinal guides 200 by lateral links 500; a lateral moving means 600 which is provided on the support frame 100 and moves the longitudinal guides 200 forwards and backwards in the lateral direction; and a longitudinal moving means 700 which is provided on the support frame 100 and moves the lateral guides 300 forwards and backwards in the longitudinal direction.

When the cover sheet to be adhered to the interior material of the vehicle is heated by the heating unit and thus softens and sags, the longitudinal moving means 700 moves the lateral guides 300 outwards in the longitudinal direction so that the lateral movable clamps 330 provided on each lateral guide 300 are moved away from each other based on the lateral fixed units 320 at the same intervals by the lateral links. Simultaneously, the lateral moving means 600 moves the longitudinal guides 200 outwards in the lateral direction so that the longitudinal movable clamps 230 provided on each longitudinal guide 200 are moved away from each other based on the longitudinal fixed unit 220 at the same intervals by the longitudinal links. Thereby, the cover sheet that has been heated and thus has softened and sagged is stretched tautly.

Hereinafter, the elements of the apparatus will be explained in more detail.

The support frame 100 according to this embodiment of the present invention is made of steel having a relatively high strength and generally has a hexahedral shape. The support frame 100 is open on the top and bottom thereof, and the cover sheet supply apparatus is provided inside the support frame 100.

Generally, the support frame 100 is disposed between upper and lower positions of a heater in the heating unit and has a plurality of threaded bolts holes for installation of a motor, a screw, an LM guide, etc. As needed, the structure of the support frame 100 can be modified in various ways by those skilled in this art.

The longitudinal guides 200 according to this embodiment of the present invention are disposed inside the support frame 100 and provided in a pair at positions spaced apart from each other by a predetermined distance. Each longitudinal guide 200 includes the longitudinal rail 210 and the longitudinal fixed unit 220 which is fixed to the longitudinal rail 210.

Each longitudinal guide 200 extends a predetermined length in the longitudinal direction and is made of metal. The longitudinal guides 200 are disposed in a space defined by the support frame 100 and configured in a pair at positions spaced apart from each other by a predetermined distance.

The longitudinal guides 200 can be moved in the support frame 100 by the lateral moving means 600 forwards and backwards in a direction perpendicular to the longitudinal guides 200.

The longitudinal rail 210 having a groove shape is longitudinally formed in an upper surface of each longitudinal guide 200.

The longitudinal movable clamps 230 move along the longitudinal rail 210.

The longitudinal fixed units 220 are fixed to the respective longitudinal rails 210. When the distance between the lateral guides is varied by the lateral moving means 600, the longitudinal movable clamps 230 are moved based on the corresponding longitudinal fixed units 220 along the longitudinal rails 210.

The lateral guides 300 according to this embodiment of the present invention are disposed inside the support frame 100 and are oriented perpendicular to the longitudinal guides 200. In addition, the lateral guides 300 are provided in a pair at positions spaced apart from each other by a predetermined distance. Each lateral guide 300 includes the lateral rail 310 and the lateral fixed unit 320 which is fixed to the lateral rail 310.

Each lateral guide 300 extends a predetermined length and is made of metal. The lateral guides 300 are disposed in the space defined by the support frame 100 and configured in a pair at positions spaced apart from each other by a predetermined distance.

The lateral guides 300 can be moved in the support frame 100 forwards and backwards in the longitudinal direction of the apparatus by the longitudinal moving means 700.

The lateral rail 310 having a groove shape is longitudinally formed in an upper surface of each lateral guide 300.

The lateral movable clamps 330 move along the lateral rail 310.

The lateral fixed units 320 are fixed to the respective lateral rails 310. When the distance between the longitudinal guides is varied by the longitudinal moving means 700, the lateral movable clamps 330 are moved based on the corresponding lateral fixed units 320 along the lateral rails 310.

The cover sheet is disposed in the space defined between the longitudinal guides 200 and the lateral guides 300. A space of a predetermined distance is formed between an outer surface of each of the longitudinal and lateral guides 200 and 300 and an inner surface of the frame so that the longitudinal guides 200 and the lateral guides 300 can move forwards, backwards, leftwards or rightwards in this space.

Preferably, the lateral fixed unit 320 and the longitudinal fixed unit 220 are clamps which can clamp a cover sheet. The reason for this is because the cover sheet must be prevented from being not clamped at positions at which the lateral fixed unit 320 and the longitudinal fixed unit 220 are disposed, given the fact that the lateral fixed units 320 and the longitudinal fixed units 220 can be disposed at any positions of the later rails 310 and the longitudinal rails 210 of the lateral guide 300 and the longitudinal guide 200.

Therefore, it is preferable that each of the lateral fixed unit 320 and the longitudinal fixed unit 220 comprises a fixed clamp which can clamp a cover sheet.

Here, the fixed clamp includes a main body which is fixed to the longitudinal rail 210 or the lateral rail 310, and a pair of clamping bars which are provided on the main body so as to be rotatable with respect to each other. The clamping bars that have been opened rotate in different directions and clamp the perimeter of the cover sheet in such a way that the area of a portion of the cover sheet that is clamped by the clamping bars is minimized.

The longitudinal movable clamps 230 according to the embodiment of the present invention clamp the cover sheet and are disposed on each longitudinal rail 210 at positions spaced apart from each other at regular intervals. The longitudinal movable clamps 230 are successively connected to each other by the longitudinal links 400 from the longitudinal fixed unit 220 to the lateral guides 300.

The longitudinal movable clamps 230, which are disposed on each longitudinal rail 210 at positions spaced apart from each other at regular intervals each comprise a clamp which can grasp the cover sheet.

That is, the longitudinal movable clamps 230 are installed on each longitudinal rail 210 at each of the left and right sides or one side of the longitudinal fixed unit 220.

Essentially, the longitudinal movable clamps 230 are connected by the longitudinal links 400 so that the longitudinal movable clamps 230 can move with regular intervals therebetween. The longitudinal movable clamps 230 are also connected to the longitudinal fixed unit 220 by the longitudinal links 400.

In other words, from the longitudinal fixed clamp to the lateral guides 300, the longitudinal movable clamps 230 are successively connected to each other by the longitudinal links 400.

In this embodiment, the longitudinal links 400 are configured such that four link sticks 410 coupled to each other by hinges 420 connect adjacent longitudinal movable clamps 230 to each other.

In detail, two first link sticks 410 are coupled at first ends thereof to each other by a hinge 420. Second ends of the two first link sticks 410 that are not coupled to each other are respectively connected to the adjacent longitudinal movable clamps 230 by hinges 420.

To enhance the reliability of movement when the longitudinal links 400 expand or contract, the other two second link sticks 410 are coupled at first ends thereof to each other by a hinge 420 at a position opposite the two first link sticks 410. Second ends of the two second link sticks 410 that are not coupled to each other are also respectively coupled to the adjacent longitudinal movable clamps 230 by the hinges 420 at the same points at which the two first link sticks 410 are coupled to the adjacent longitudinal movable clamps 230.

The construction of each longitudinal movable clamp 230 is the same as that of the above-mentioned fixed clamp, and therefore detailed explanation thereof will be omitted. Having the same construction, the fixed clamp and the longitudinal movable clamp 230 differ from each other only in whether it is fixed to the longitudinal rail 210 or not.

As such, the longitudinal movable clamps 230 are maintained on the longitudinal guide 200 by the longitudinal links

400. Therefore, when the lateral guides 300 are moved forwards and backwards in the longitudinal direction by the longitudinal moving means 700, the longitudinal movable clamps 230, interlocked with the movement of the lateral guides 300, are moved along the longitudinal rail 210 with regular intervals therebetween.

As a result, interlocked with the movement of the lateral guides 300, the longitudinal movable clamps 230 uniformly stretch the entirety of the cover sheet in the longitudinal direction as the longitudinal links 400 uniformly expand between the longitudinal movable clamps 230.

The lateral movable clamps 330 according to the embodiment of the present invention clamp the cover sheet and are disposed on each lateral rail 310 at positions spaced apart from each other at regular intervals. The lateral movable clamps 330 are successively connected to each other by the lateral links 500 from the lateral fixed unit 320 to the longitudinal guides 200.

The lateral movable clamps 330, which are disposed on each lateral rail 310 at positions spaced apart from each other at regular intervals, each comprise a clamp which can grasp the cover sheet.

That is, the lateral movable clamps 330 are installed on each lateral rail 310 at each of the left and right sides or one side of the lateral fixed unit 320.

Essentially, the lateral movable clamps 330 are connected by the lateral links 500 so that the lateral movable clamps 330 can move with regular intervals therebetween. The lateral movable clamps 330 are also connected to the lateral fixed unit 320 by the lateral links 500.

In other words, from the lateral fixed clamp to the longitudinal guides 200, the lateral movable clamps 330 are successively connected to each other by the lateral links 500.

In this embodiment, the lateral links 500 are configured such that four link sticks 410 coupled to each other by hinges 420 connect adjacent lateral movable clamps 330 to each other.

In detail, two first link sticks 410 are coupled at first ends thereof to each other by a hinge 420. Second ends of the two first link sticks 410 that are not coupled to each other are respectively connected to the adjacent lateral movable clamps 330 by hinges 420.

To enhance the reliability of movement when the lateral links 500 expand or contract, the other two second link sticks 410 are coupled at first ends thereof to each other by a hinge 420 at a position opposite the two first link sticks 410. Second ends of the two second link sticks 410 that are not coupled to each other are also respectively coupled to the adjacent lateral movable clamps 330 by the hinges 420 at the same points at which the two first link sticks 410 are coupled to the adjacent lateral movable clamps 330.

The construction of each lateral movable clamp 330 is the same as that of the above-mentioned fixed clamp, and therefore detailed explanation thereof will be omitted.

As such, the lateral movable clamps 330 are maintained on the lateral guide 300 by the lateral links 500. Therefore, when the longitudinal guides 200 are moved by the lateral moving means 600 forwards and backwards in the lateral direction, the lateral movable clamps 330, interlocked with the movement of the longitudinal guides 200, are moved along the lateral rail 310 with regular intervals therebetween.

As a result, interlocked with the movement of the longitudinal guides 200, the lateral movable clamps 330 uniformly stretch the entirety of the cover sheet in the lateral direction as the lateral links 500 uniformly expand between the lateral movable clamps 330.

The longitudinal links 400 and the lateral links 500 are members which can expand and contract. Although, as needed, various members can be used as the longitudinal links 400 and the lateral links 500 so long as they can expand and contract, links are advantageous in that when they expand or contract, the expansion or contraction ratio is maintained constant.

For example, if a member such as a spring, which may vary in expansion ratio over time, is used, the movement ranges of the longitudinal movable clamps 230 that are relatively distant from the longitudinal fixed unit 220 are reduced with the passage of time.

In this case, the expansion ratio of the cover sheet that must be uniformly stretched over the entire length finely varies depending on a position, whereby the quality of the cover sheet is reduced.

The lateral moving means 600 according to the embodiment of the present invention is provided on the support frame 100 and moves the longitudinal guides 200 forwards and backwards in the lateral direction.

Provided on the support frame 100, the lateral moving means 600 supports the longitudinal guides 200 inside the support frame 100 and moves the longitudinal guides 200 forwards and backwards in the lateral direction within space defined in the support frame 100.

Preferably, the lateral moving means 600 includes a lateral screw 610 and a lateral motor 620 to move the longitudinal guides 200 inside the support frame 100. The reason for this is because the lateral motor 620 and the lateral screw 610 that can be precisely moved by the number of revolutions of the lateral motor 620 can more precisely move the longitudinal guides 200 at the same rate, compared to using a hydraulic cylinder which uses air or the like to linearly move the longitudinal guides 200.

The lateral screw 610 is configured such that a first end thereof passes through predetermined portions of the longitudinal guides 200 so as to move the longitudinal guides 200 in the lateral direction, and a second end of the lateral screw 610 is disposed inside the support frame 100.

Provided on the support frame 100, the lateral motor 620 rotates the second end of the later screw 610. The lateral screw 610 rotates in one direction depending on the direction of rotation of the lateral motor 620, thus moving the longitudinal guides 200 forwards and backwards in the lateral direction.

More preferably, a pair of lateral screws 610 are respectively provided on opposite ends of the longitudinal guides 200. An auxiliary lateral screw 630 is coupled to second ends of the lateral screws 610 in such a way that the auxiliary lateral screw 630 is interlocked with the lateral screws 610. When the lateral motor rotates the auxiliary lateral screw 630, the lateral screws 610 interlocked with the auxiliary later screw 630 is rotated.

The reason for this is to precisely align the left and right ends of the two longitudinal guides 200 with each other when the longitudinal guides 200 move. As such, because the opposite ends of the longitudinal guides 200 are under the control of the lateral screws 610, the longitudinal guides 200 can be precisely moved by the number of revolutions of the lateral screws 610.

The longitudinal moving means 700 according to the embodiment of the present invention is provided on the support frame 100 and moves the lateral guides 300 forwards and backwards in the longitudinal direction.

Provided on the support frame 100, the lateral moving means 600 supports the lateral guides 300 inside the support frame 100 and moves the lateral guides 300 forwards and backwards in the longitudinal direction within space defined between the support frame 100 and the lateral guides 300.

Preferably, the longitudinal moving means 700 includes a lateral screw 610 and a lateral motor 620 to move the lateral guides 300 inside the support frame 100.

The longitudinal screw 710 is configured such that a first end thereof passes through predetermined portions of the lateral guides 300 so as to move the lateral guides 300 in the longitudinal direction, and a second end of the lateral screw 610 is disposed inside the support frame 100.

Provided on the support frame 100, the longitudinal motor 720 rotates the second end of the longitudinal screw 710. The longitudinal screw 710 rotates in one direction depending on the direction of rotation of the longitudinal motor 720, thus moving the lateral guides 300 forwards and backwards in the longitudinal direction.

More preferably, a pair of longitudinal screws 710 are respectively provided on opposite ends of the lateral guides 300. An auxiliary lateral screw 730 is coupled to second ends of the longitudinal screws 710 in such a way that the auxiliary lateral screw 730 is interlocked with the longitudinal screws 710. When the longitudinal motor rotates the auxiliary lateral screw 730, the longitudinal screws 710 interlocked with the auxiliary lateral screw 730 are rotated.

The reason for this is to precisely align the left and right ends of the two lateral guides 300 with each other when the lateral guides 300 move. As such, because the opposite ends of the lateral guides 300 are under the control of the longitudinal screws 710, the lateral guides 300 can be precisely moved by the number of revolutions of the longitudinal screws 710.

Preferably, the longitudinal fixed unit 220 and the lateral fixed unit 320 are respectively disposed in a medial portion of the longitudinal rail 210 and a medial portion of the lateral rail 310. Here, the principle of the lateral fixed unit 320 is the same as that of the longitudinal fixed unit 220, and therefore further explanation thereof will be omitted.

Because the longitudinal movable clamps 230 are coupled to each other and to the longitudinal fixed unit 220 by the longitudinal links 400, tensile force applied to the longitudinal links 400 is different in magnitude depending on the length.

Furthermore, a height at which the longitudinal movable clamps 230 are disposed differs from that at which the lateral movable clamps 330 are disposed.

In other words, the longitudinal guides 200 and the lateral guides 300 are coupled to each other with a height difference therebetween so as to prevent them from interfering with each other while they move in the longitudinal or lateral direction. Here, the cover sheet must be stretched in the same plane. Therefore, for example, if the longitudinal guides 200 are disposed lower than the lateral guides 300, it is preferable that a height compensation member be provided to increase and compensate for the height of each longitudinal movable clamp 230 such that the height of the longitudinal movable clamps 230 is the same as that of the lateral movable clamps 330.

As described above, the basic technical notion of the present invention is that a plurality of clamps connected to each other by links clamp the perimeter of a cover sheet and then are horizontally moved by means of a screw to stretch the cover sheet that has been heated and thus has softened and sagged. Although the preferred embodiment of the present invention has been disclosed for illustrative purposes, those skilled in the art will appreciate that various modifications, additions and substitutions are possible.

The present invention relates to a cover sheet supply apparatus having variable clamps for thermoforming machines. The present invention can be used in a field related to the cover sheet supply apparatus in which a plurality of clamps connected to each other by links clamp the perimeter of a cover sheet and then are horizontally moved by means of a screw to uniformly stretch, in four side directions, the entire area of the cover sheet that has been heated and thus has softened and sagged.

What is claimed is:

1. A cover sheet supply apparatus for a thermoforming machine, the thermoforming machine including a heating unit for heating the cover sheet to be adhered to a target object, the cover sheet supply apparatus comprising:
   a support frame (100);
   a pair of longitudinal guides (200) disposed in the support frame (100) at positions spaced apart from each other, each of the longitudinal guides (200) comprising a longitudinal rail (210), with a longitudinal fixed unit (220) fixed to a medial area of the longitudinal rail (210);
   a pair of lateral guides (300) disposed in the support frame (100) at positions spaced apart from each other and on opposite sides of the longitudinal guides (200), each of the lateral guides (300) comprising a lateral rail (310), with a lateral fixed unit (320) fixed to a medial area of the lateral rail (310);
   a plurality of longitudinal movable clamps (230) installed on each of the longitudinal rails (210) to clamp the cover sheet at multiple locations with the longitudinal movable clamps (230), the longitudinal movable clamps (230) being successively connected to one another by a longitudinal link (400) from the medially-located longitudinal fixed unit (220) and to the lateral guides (300);
   a plurality of lateral movable clamps (330) installed on each of the lateral rails (310) to clamp the cover sheet at multiple locations with the lateral movable clamps (330), the lateral movable clamps (330) being successively connected to one another by a lateral link (500) from the medially-located lateral fixed unit (320) and to the longitudinal guides (200);
   a lateral moving means (600) configured to move the longitudinal guides (200) toward and away from each other in a lateral direction, and thereby allowing the lateral movable clamps (330) to expand equidistantly along the lateral rails (310) in response to an away movement of the longitudinal guides (200) to stretch the cover sheet with the multiple lateral movable clamps (330) as the cover sheet is heated and expanded by the heating unit; and
   a longitudinal moving means (700) configured to move the lateral guides (300) toward and away from each other in a longitudinal direction, and thereby allowing the longitudinal movable clamps (230) to expand equidistantly along the longitudinal rails (210) in response to an away movement of the lateral guides (300) to stretch the cover sheet with the multiple longitudinal movable clamps (230) as the cover sheet is heated and expanded by the heating unit.

2. The cover sheet supply apparatus of claim 1, wherein the lateral moving means (600) comprises:
   a lateral screw (610) passing through predetermined portions of the longitudinal guides (200) to move the longitudinal guides (200) in the lateral direction, the lateral screw (610) being provided at opposite ends thereof in the support frame (100); and
   a lateral motor (620) configured to rotate the lateral screw (610).

3. The cover sheet supply apparatus of claim 1, wherein the longitudinal moving means (700) comprises:
- a longitudinal screw (710) passing through predetermined portions of the lateral guides (300) to move the lateral guides (300) in the longitudinal direction, the longitudinal screw (710) being provided at opposite ends thereof in the support frame (100); and
- a longitudinal motor (720) configured to rotate the longitudinal screw (710).

4. The cover sheet supply apparatus of claim 1, wherein each of the lateral fixed units (320) and the longitudinal fixed units (220) comprises a fixed clamp configured to clamp the cover sheet.

5. The cover sheet supply apparatus of claim 4, wherein the fixed clamp is disposed on the medial area of each of the longitudinal guides (200) and the lateral guides (300).

6. The cover sheet supply apparatus of claim 1, wherein the longitudinal movable clamps (230) are disposed at a different height from the lateral movable clamps (330).

7. The cover sheet supply apparatus of claim 1, wherein each of the longitudinal link (400) and the lateral link (500) comprises a plurality of link sticks (410) coupled to each other by a hinge (420).

\* \* \* \* \*